United States Patent Office 2,914,462
Patented Nov. 24, 1959

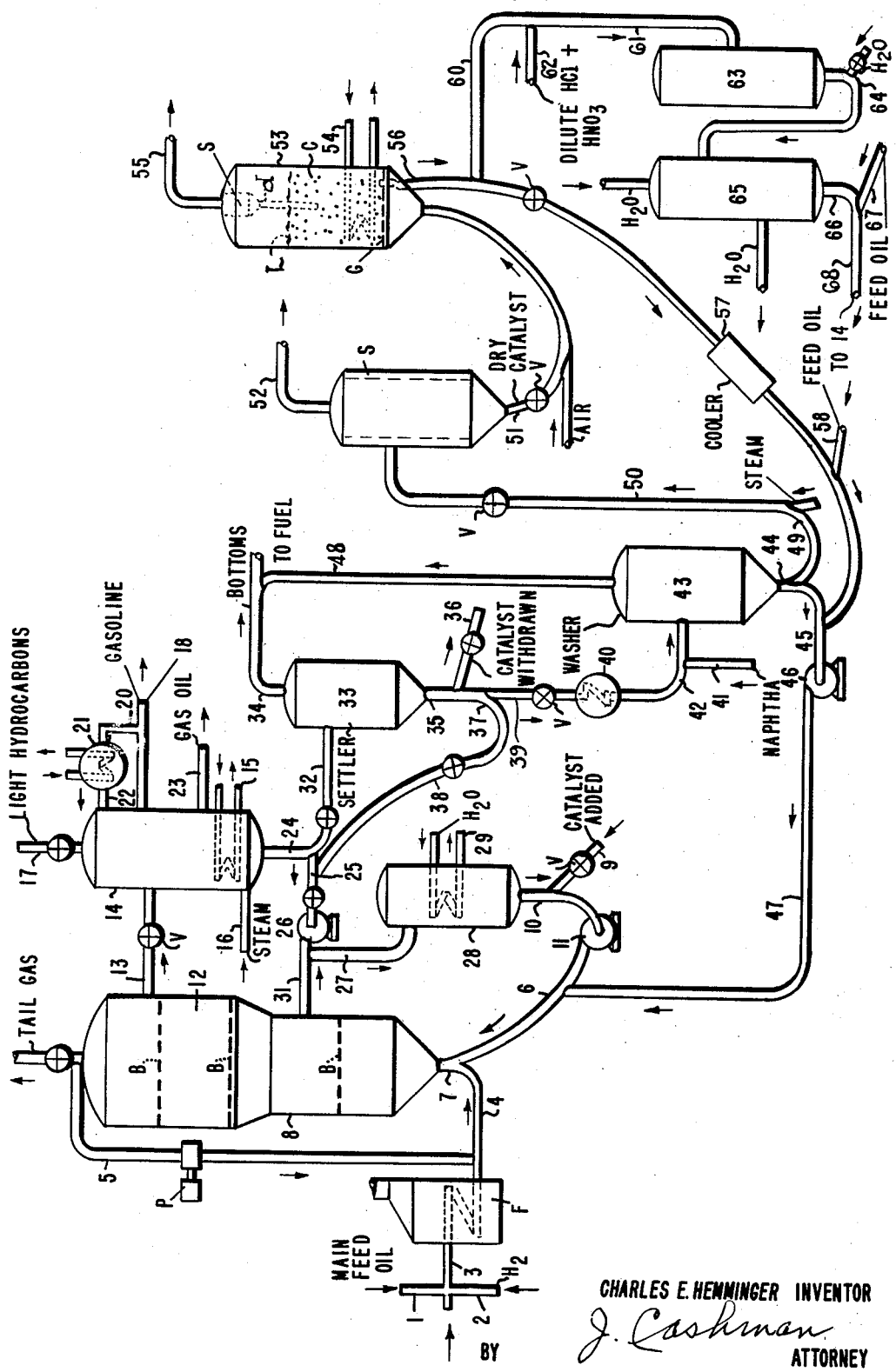

2,914,462

SLURRY LIQUID PHASE HYDROGENATION

Charles E. Hemminger, Westfield, N.J., assignor to Esso Research and Engineering Company, a corporation of Delaware Application December 31, 1953, Serial No. 401,633

8 Claims. (Cl. 208—112)

The present invention relates to improvements in upgrading hydrocarbon oils. More particularly, the present invention relates to hydrocracking heavy hydrocarbon oils to form primarily heating and gas oil as products, also to remove sulfur, to remove coke forming constituents, to remove metals and their salts contained in the original feed oil, and otherwise to improve the crude hydrocarbon oil.

One important aspect of the present invention relates to upgrading a total crude oil or the heavy bottoms thereof by catalytic hydrogenation in a sump phase operation, the process being characterized in that a regeneratable hydrogenating catalyst is employed, that the process is operated continuously, that means are provided for controlling the temperature of the hydrogenation by withdrawing a portion of the oil from the reaction zone, cooling it and returning it to the reaction zone. It is also pointed out that the oil may not be subjected to ultimate conversion, but rather the process may be operated as to convert, say, 90% of the original feed, leaving about 10% unconverted material. The reason for converting to the extent last stated is that salts, such as iron salts, vanadium salts and nickel salts contained in the feed are at least partially removed in the unconverted material, and thus are not present to contaminate the catalysts employed in subsequent conversions of the product, as where the gas oil is catalytically cracked or the naphtha hydroformed. Of course, in the case where the feed material is low in contaminating metals or metal salts, the present process may be carried out to ultimate conversion of the feed.

The prior art contains numerous proposals for upgrading heavy bottoms to form gasoline and gas oil for cracking. One of these proposals involves what is known as coking of heavy bottoms to produce normally liquid products of lower boiling range, including gas oil and gasoline. The coking of heavy bottoms does not result in the production of good gas oil ordinarily, since the gas oil thus produced contains substantial quantities of polycyclic aromatics in a condensed nucleus which, when cracked, cause the formation of inordinately large quantities of coke on the catalyst when they are used as a feed stock in a catalytic cracking operation. Another drawback is that the coking operation does not result ordinarily in the removal of any substantial amount of sulfur so that the product may contain undesirable amounts of sulfur.

In brief compass, the present invention involves, as previously indicated, a slurry hydrogenation process which is operated continuously to hydrogenate destructively hydrocarbon oils to produce products of increased value. The process is a catalytic operation and means are provided for separating the catalyst from the products of the hydrogenation, regenerating the catalyst with an oxygen-containing gas to remove carbon and other contaminating deposits, and also includes treatment of the catalyst with oxidizing means, such as diluted aqua regia to effect a redistribution of the active component of the hydrogenation catalyst, which catalyst may be a supported catalyst such as cobalt molybdate carried on an active form of alumina. It is, however, pointed out that any good hydrogenation catalyst may be employed in the present process, such as the metals of the IV, V, VI and VIII groups or the periodic system, or the oxides and sulfides of these metals or mixtures of the oxides or sulfides of these metals. These hydrogenation catalysts are well known in the art.

In the accompanying drawing there is depicted, diagrammatically, partially in vertical section, an apparatus layout in which a preferred modification of the present invention may be carried into effect.

Referring in detail to the drawing a feed stock which is hereinafter more fully described, is introduced into the present system through line 1 and mixed with a hydrogen-containing gas from line 2 in line 3, and this mixture is then passed through a suitable heating means, such as a furnace F. The heated mixture is withdrawn from the furnace through line 4 where it is admixed with tail gas from line 5 and recycle oil from line 6, in line 7, and this mixture is charged to the bottom of hydrogenator 8 wherein it flows upwardly. The catalyst used in the process may be charged to any convenient point such as via line 9 to line 10, the catalyst being in the form of an oil slurry, and this slurry is pumped via slurry pump 11, through lines 6 and 7 into the reactor 8 with the fresh feed oil and $H_2$ as previously indicated. It is pointed out that reactor 8 may be provided with an expanded upper portion 12, which provides a settling chamber wherein catalyst slurried with the liquid tends to settle toward the lower non-expanded portion of reactor 8. It is also pointed out that reactor 8 is provided with a plurality of spaced perforate baffles B, which baffles tend to prevent back-mixing of the liquid but, however, back-mixing of the catalyst is not impeded due to the fact that the perforations in the said baffles B are sufficiently large to effect this result. Under conditions of temperature, pressure, flow rates and the like, more fully set forth hereinafter, the desired conversion occurs and a product is withdrawn from an upper point in reactor 8 via valved line 13 and charged to a fractional distillation column 14. Valve V in line 13 is a pressure reducing valve causing the fractional distillation column 14 to operate under a substantially lower pressure than that prevailing in reactor 8. As usual, the fractional distillation column is provided with reboiling means 15, and it is also provided with steam introduced through line 16 so as to effect a steam distillation of the product entering from line 13 to effect maximum recovery of volatile products. The steam and light hydrocarbons are withdrawn overhead from fractional distillation column 14 via line 17. A gasoline fraction is taken off from fractionating column 14 via line 18 and delivered to storage (not shown). A portion of this gasoline fraction, however, may be passed for reflux purposes via line 20 through a cooler 21 and recycled via line 22 to an upper point of fractional distillation column 14. The main product, which is gas oil, is taken off from fractional distillation column 14 via line 23 and delivered to storage means (not shown). A bottoms fraction containing catalyst is taken off through line 24 and a portion of this bottoms is charged via line 24 to line 25, and thence passed through pump 26 into line 27, thence forced through a cooler 28 provided with a cooling means 29. The cooled material is withdrawn from cooling means 28 via line 10 and returned by pump 11 and lines 6 and 7 to reactor 8, as previously indicated. Referring again to reactor 8, it is pointed out that a portion of the material therein is withdrawn at a mid-point from the reactor 8 via line 31, mixed with the material from line 25 in line 27 and passed through the cooler 28 and recycled to the reactor. This is done for the purpose of removing heat from the reactor 8 in which, of course, the exothermic reaction of hydrogenation is occurring. By the means indicated, viz, the cooling of the recycled oil, therefore, the temperature in reactor 8 is effectively controlled. Furthermore, the recycling of the material in line 31 tends to increase the flow velocities in the lower portion of reactor 8 and that has the advantage of maintaining the catalyst suspended in oil.

Having thus described the main operation, the method of recovering and reactivating the catalyst will now be described. Referring again to line 24, a portion of this slurried material is passed via line 32 into a liquid settler 33 where it is permitted to remain in a quiescent state to permit catalyst to settle toward the bottom thereof. The clear upper portion of the liquid is decanted therefrom via line 34, or removed by any other suitable means. The material in line 34 which is substantially unconverted material contains a substantial portion of the contaminating metals or metal salts present in the original feed, and these bottoms are rejected from the present system for use, say, as a fuel. The bottoms portion from settler 33 is withdrawn through line 35 and a small portion of this material containing catalyst may be rejected from the system through line 36. The main portion of this slurry in line 35 is passed via line 37 either for return to the reactor 8 via line 38 and the connecting lines indicated or passed via valved line 39 and cooler 40, after admixture with a stream of naphtha, gas oil or other oil, introduced into the system through line 41 via line 42 into a washing vessel 43 where the solvent oil removes heavy oily material from the catalyst, which cleaned catalyst is then withdrawn from the bottom of the washer 43, through line 44 in slurry form, and thence passed via line 45 to a slurry pump 46, which forces the said cleaned catalyst in slurry form via line 47 to lines 6 and 7 for return to the reactor. The solvent oil and the dissolved heavy oily material are withdrawn overhead from washer 43, through line 48, and this stream also contains a substantial portion of those undesired metals such as iron, vanadium, etc., or compounds thereof present in the original oil, and thus by this means these metals are separated from the product oils and rejected from the system. The solvent oil may be recovered for further use in the process in conventional distillation means (not shown).

Referring again to the material containing catalyst in line 44 there comes a time when it is necessary to subject this catalyst to regeneration with an oxygen-containing gas, such as air to remove carbonaceous and sulphur deposits thereon. Toward this end, therefore, a portion of the material in line 44 is passed into line 49 into which line there is charged a portion of steam and the material is passed via line 50 into gas-solids separator S. Line 50 is provided with a reducing valve V so that the pressure in separator S is substantially lower than that in washer 43. The steam serves to strip substantially all of the oily material from the catalyst and the suspension of catalyst in gasiform material which is charged to the "cyclone" S is separated in substantially dry form from the gasiform material and removed from the cyclone S via valved line 51, vaporiform material passing overhead via line 52. This vaporiform material in line 52 may be treated by conventional means (not shown) to recover its oil values. Two or more cyclones may be employed to effect this separation. The dry catalyst in valved line 51 is mixed with air and formed into a suspension and carried into a regeneration vessel 53 where it is formed into a fluidized bed C and under conventional conditions of time and temperature the carbonaceous and other deposits are removed by burning them off the catalyst. The regenerator 53 is provided with suitable cooling means 54 to prevent the catalyst from being heated to a temperature above 1200° F. The fumes resulting from the regeneration are rejected from the regenerator through line 55. As usual, the fumes about to emerge from the regenerator are forced through one or more cyclones S wherein entrained catalyst is separated from the said fumes and returned to the fluidized bed of catalyst C through one or more dip pipes d. Referring again to the bed of catalyst C undergoing regeneration, it is pointed out that, as usual, the bed of catalyst is supported on a grid or other foraminous member G, and the dense fluidized bed has an upper dense phase level L positioned at a point substantially below the top of the regenerator so as to provide a catalyst separation zone in the upper portion of said vessel. It may be necessary and desirable to subject the catalyst C in regenerator 53 to an air or oxygen soaking, following the conventional regeneration. In other words, following substantial removal of the carbonaceous and other deposits from the catalyst by conventional regeneration, the catalyst may be permitted to remain in contact with or "soak" in air or oxygen at a temperature about 1050°–1200° F. for 4 to 24 hours. This latter treatment called "rejuvenation" is used to reactivate the catalyst when, after repeated regenerations, it fails to respond to conventional regeneration. It is accomplished after the carbon is removed from the catalyst. The oxygen partial pressure may be about 15 lbs. per sq. in. The regenerated and/or reactivated catalyst is withdrawn from vessel 53 via line 56, passed through a cooler 57 and mixed with feed oil from line 58 and the slurry thus formed is passed to line 45 for return to the reactor.

If the regeneration of the catalyst and the subsequent rejuvenation by soaking in oxygen-containing gas for an extended period of time does not restore the activity of the catalyst, it may be subjected to treatment by means presently to be described. In other words, continuous use of the catalyst in on-stream and regeneration periods may result in effecting an increase in the crystal size which presumably has the effect of deactivating the catalyst permanently so that it will not respond to normal regeneration and/or rejuvenation. Instead of reworking the catalyst by dissolving the active hydrogenation component from the carrier, the deactivated catalyst may be treated as follows to restore its activity. A portion of the catalyst in line 56 is passed via line 60 into line 61 containing a water diluted mixture of nitric acid and hydrochloric acid introduced through line 62. This mixture contains, preferably, from 0.01–2.5 mols of $HNO_3$ and from 0.01–3.0 mols of HCl in an aqueous medium. The catalyst is formed into a slurry in these mixed acids in aqueous solution and passed to a treating zone 63 where it is treated at normal room temperature with the mixed acids. The effect of this treatment is to redisperse the active hydrogenation-dehydrogenation component of the catalyst on the carrier, and at the same time to reduce the crystal size of the said hydrogenation-dehydrogenation component or even to convert the said active component to a desired and more active noncrystalline form. The thus treated catalyst is withdrawn in slurry form through 64 and charged into a washing zone 65 where it is treated with water to remove the acid. The water slurry containing the reactivated catalyst is withdrawn from washer 65 through line 66 and charged into another portion of the feed introduced in the present system through line 67, and this mixture is conveyed via line 68 and conducted to fractionator 14.

In order to explain the present invention more fully, the following information is set forth:

CONDITIONS IN REACTOR 8

| | Range | Preferred |
|---|---|---|
| Catalyst | 10 wt. percent cobalt molybdate, 90 wt. percent alumina | |
| Temperature, °F | 700–850 | 800 |
| Pressure, p.s.i. | 200–750 | 400 |
| Time, W./Hr./W.[1] | 0.2–10 | 2 |
| Cubic feet $H_2$, standard conditions | 300–8,000 | 1,000 |
| Concentration of $H_2$, vol. percent | 50–95 | 75 |

[1] Feed rate=lbs. of oil per hour per lb. of catalyst in the reactor.

RECYCLE RATIO

It will be noted, as previously pointed out, that a portion of the oil in 8 is withdrawn through line 31, cooled in 28 and returned to reactor 8. Of course, this is for the purpose of controlling temperature in reactor 8 in which an exothermic reaction is occurring. The recycle ratio to control temperature will, of course, depend on the particular stock being treated, but the recycle to fresh feed ratio will generally be of the order of from about 3–7 volumes of recycle oil per volume of fresh feed oil introduced through line 1. Preferably, this ratio would be from 4–5 volumes of cooled recycle oil per volume of oil introduced in line 1. The temperature drop in cooler 25 is preferably of the order of 25°–50° F.

FLASH DRUM 14

In order to secure best results, this drum is operated at about atmospheric pressure to remove substantially all of the light hydrocarbons from the system.

REGENERATOR 53

This regeneration procedure is carried out, preferably, at atmospheric pressure and the regeneration is conducted and controlled so as to prevent heating the catalyst above about 1200° F., a temperature of from about 1000°–1100° F. being preferred.

COOLER 57

The hot regenerated catalyst proceeding from 53 must, of course, be cooled and toward this end the said catalyst is cooled to a temperature below cracking temperature, namely, of the order of 600°–800° F. before it is mixed with oil introduced in line 58.

GENERAL

It is pointed out that the system illustrated in the accompanying drawing is operated under substantially atmospheric pressure except for reactor 8 and cooler 28 and, of course, the lines feeding these elements of the system.

Example

There is set forth herein an example in which a West Texas-Salt Flat crude was processed. This was a total crude and possessed the following characteristics:

Sulfur = 1.48 wt. percent

It contained constituents boiling within the percentages indicated:

Initial boiling point: Percent (vol.)
430° F. ----------------------------------- 41.4
430–650 ----------------------------------- 26.0
650–950 ----------------------------------- 23.6
950+ -------------------------------------- 19.0

This total crude may be treated in reactor 8 under the following conditions to give the results set forth below:

Temperature _____ ° F__ 784
Pressure _____ p.s.i.g__ 400
W./hr./w. _____ 0.2
Std. cubic feet of hydrogen fed to the reactor 8 per barrel of oil fed_____ 6690
Concentration of hydrogen_____ percent__ 75

RESULTS

The product was analyzed for sulfur and found to contain 0.16%. An inspection of the liquid product obtained is as follows:

Initial: Percent (vol.)
430° F_____ 35.2
430–650 _____ 32.9
650–950 _____ 24.4
950+ _____ 3.0

It will be noted that the product as a result of the foregoing treatment was very low in sulfur which, of course, is a very important advantage of the process. Another result of the process is that about 90% of contaminating metals, such as iron, vanadium, etc. were removed.

To recapitulate briefly, the present invention relates to upgrading or beneficiating a total crude or a reduced crude for the purpose of producing a maximum quantity of gas oil which is substantially free of sulfur, sodium chloride, calcium chloride, magnesium chloride and contaminating metals, such as iron, vanadium, etc. which are often present in the original crude. In general, the process involves a continuous destructive hydrogenation of the crude oil in sump phase in the presence of a hydrogenation catalyst which is, preferably, cobalt molybdate carried on alumina, but which, however, may be any good hydrogenation catalyst, such as molybdenum sulfide suitably supported on platinum group metals, supported on alumina, or a mixture of nickel and tungsten sulfides. The molybdena sulfide and other sulfide or metallic catalysts can also be supported on activated alumina containing 0.5–5% silica or a spinel of zinc and alumina, zinc aluminate. In the case of platinum, a good catalyst is one containing 0.5 wt. percent Pt carried on 99.5 wt. percent $Al_2O_3$. An important feature of the present invention involves recycling of oil from the hydrogenator after cooling to control temperature in the hydrogenation zone. Another important aspect of the invention involves catalyst regeneration and, if necessary, rejuvenation and a further treatment with dilute aqua regia or chlorine if the catalyst is not reactivated by conventional regeneration and/or rejuvenation.

Many modifications of the present invention may be made by those who are skilled in the present art without departing from the spirit thereof.

What is claimed is:

1. A continuous method for forming gas oil substantially free of sulfur and contaminating metals and salts from a crude oil containing sulfur, metals and salts which comprises subjecting the said crude oil in a hydrogenation zone having an upper expanded portion to destructive hydrogenation at superatmospheric pressure and elevated temperatures in the presence of added hydrogen, the said oil being in liquid phase and containing a hydrogenation catalyst suspended therein, preventing substantial backmixing of oil from the upper expanded portion of said zone to a lower portion thereof, permitting catalyst to settle from the upper expanded portion of said zone to the lower portion whereby the conversion of formed gas oil to gasoline and other low boiling product is minimized, withdrawing a portion of the oil from the upper portion of the restrictd part of the hydrogenation zone, cooling said oil and returning the cooled oil to the hydrogenation zone for the purpose of controlling temperature therein, recovering a product containing substantial quantities of gas oil from the upper expanded portion of said hydrogenation zone, subjecting the said withdrawn product to fractional distillation, recovering a gas oil product from said fractional distillation zone, withdrawing a heavy bottoms from said fractional distillation zone containing metals, salts and catalyst, charging the said heavy bottoms to a settling zone wherein catalyst is separated from said bottoms, rejecting said bottoms containing metals and salts from the system and returning recovered catalyst to the hydrogenation zone.

2. The method set forth in claim 1 in which the catalyst is cobalt molybdate carried on alumina.

3. The method set forth in claim 1 in which there is fed to the reaction zone from about 3–7 volumes of cooled recycle oil per volume of fresh feed oil.

4. The method set forth in claim 1 in which the said crude oil is high in sulfur content and the gas oil obtained as product is low in sulfur content.

5. The method set forth in claim 1 in which the catalyst is separated from the product oil and subjected to treatment with an oxygen-containing gas to remove carbonaceous and other deposits thereon so that the said catalyst is regenerated.

6. The method set forth in claim 1 in which the catalyst contains platinum.

7. The method set forth in claim 1 in which the catalyst contains cobalt molybdate.

8. The method set forth in claim 1 in which a portion of the catalyst recovered from the settling zone is washed to free it from contaminating oil, dried, subjected to the influence of a regeneration gas whereby the said catalyst is regenerated, and returning the regenerated catalyst to the hydrogenation zone.

References Cited in the file of this patent

UNITED STATES PATENTS

| | | |
|---|---|---|
| 1,972,948 | Payne | Sept. 11, 1934 |
| 2,161,974 | Peck | June 13, 1939 |
| 2,344,208 | Kirkpatrick | Mar. 14, 1944 |
| 2,425,098 | Kassel | Aug. 5, 1947 |
| 2,447,149 | Wier | Aug. 17, 1948 |
| 2,479,109 | Haensel | Aug. 16, 1949 |
| 2,632,720 | Perry | Mar. 24, 1953 |
| 2,662,846 | Montgomery et al. | Dec. 15, 1953 |
| 2,700,015 | Joyce | Jan. 18, 1955 |
| 2,704,281 | Appell | Mar. 15, 1955 |
| 2,706,167 | Harper et al. | Apr. 12, 1955 |
| 2,706,705 | Oettinger | Apr. 19, 1955 |
| 2,708,180 | Von Fuener | May 10, 1955 |
| 2,723,943 | McAfee | Nov. 15, 1955 |
| 2,740,762 | Earley | Apr. 3, 1956 |
| 2,762,752 | Hemminger | Sept. 11, 1956 |